United States Patent
Cooperman et al.

(10) Patent No.: US 12,196,373 B2
(45) Date of Patent: Jan. 14, 2025

(54) VACUUM INSULATED CRYOGENIC STORAGE VESSEL

(71) Applicant: CB&I STS Delaware LLC, The Woodlands, TX (US)

(72) Inventors: Alexander Cooperman, Lisle, IL (US); Randy Lee Eberly, Plainfield, IL (US); John Andrew Jacobson, Plainfield, IL (US); Steven Matthew Cihlar, St. Charles, IL (US); David Thomas Creech, Glen Ellyn, IL (US)

(73) Assignee: CB&I STS Delaware LLC, The Woodlands, TX (US)

( * ) Notice: Subject to any disclaimer, the term of this patent is extended or adjusted under 35 U.S.C. 154(b) by 61 days.

(21) Appl. No.: 18/074,049

(22) Filed: Dec. 2, 2022

(65) Prior Publication Data
US 2023/0175648 A1  Jun. 8, 2023

Related U.S. Application Data

(60) Provisional application No. 63/285,898, filed on Dec. 3, 2021.

(51) Int. Cl.
*F17C 3/02* (2006.01)
*F17C 3/08* (2006.01)

(52) U.S. Cl.
CPC ............. *F17C 3/022* (2013.01); *F17C 3/08* (2013.01); *F17C 2201/0128* (2013.01);
(Continued)

(58) Field of Classification Search
CPC .... F17C 3/022; F17C 3/08; F17C 2201/0128; F17C 2201/052; F17C 2203/012;
(Continued)

(56) References Cited

U.S. PATENT DOCUMENTS

| | | | | | |
|---|---|---|---|---|---|
| 3,196,622 | A | * | 7/1965 | Smith | F17C 3/005 220/592.27 |
| 3,300,982 | A | * | 1/1967 | Meade | F17C 3/005 62/260 |
| 3,326,011 | A | * | 6/1967 | Sparling | F17C 3/005 165/45 |
| 3,360,941 | A | * | 1/1968 | Glover | F17C 3/005 48/178 |
| 3,379,012 | A | * | 4/1968 | Glover | E04H 7/065 48/178 |

(Continued)

FOREIGN PATENT DOCUMENTS

| CN | 115046128 A | 9/2022 |
|---|---|---|
| DE | 2245668 A1 | 1/1974 |

(Continued)

OTHER PUBLICATIONS

Taiwan Office Action dated Aug. 15, 2023 for Application No. 111146385.

(Continued)

*Primary Examiner* — Kareen K Thomas
(74) *Attorney, Agent, or Firm* — PATTERSON + SHERIDAN, LLP

(57) ABSTRACT

A cryogenic vessel includes an outer vessel at least partially formed from a reinforced concrete. The cryogenic vessel further includes an inner vessel disposed in the outer vessel. The cryogenic vessel further includes an airtight liner disposed between the inner vessel and the outer vessel, wherein the liner is anchored to the outer vessel. The cryogenic vessel further includes a vacuum space disposed between the inner vessel and the liner, wherein an insulation material is disposed in the vacuum space.

25 Claims, 4 Drawing Sheets

(52) U.S. Cl.
CPC .. *F17C 2201/052* (2013.01); *F17C 2203/012* (2013.01); *F17C 2203/0341* (2013.01); *F17C 2203/0391* (2013.01); *F17C 2203/0604* (2013.01); *F17C 2203/0629* (2013.01); *F17C 2203/0639* (2013.01); *F17C 2203/0678* (2013.01); *F17C 2205/0103* (2013.01); *F17C 2221/012* (2013.01); *F17C 2223/0161* (2013.01); *F17C 2270/0134* (2013.01)

(58) Field of Classification Search
CPC ...... F17C 2203/0341; F17C 2203/0391; F17C 2203/0604; F17C 2203/0629; F17C 2203/0639; F17C 2203/0678; F17C 2205/0103; F17C 2221/012; F17C 2223/0161; F17C 2270/0134; F17C 2203/035; F17C 2205/018; F17C 2209/221; F17C 2209/228; F17C 2221/011; F17C 2221/014; F17C 2221/017; F17C 2223/033; F17C 2260/011; F17C 2260/032; F17C 2260/033; Y02E 60/32
See application file for complete search history.

(56) References Cited

U.S. PATENT DOCUMENTS

| | | | | |
|---|---|---|---|---|
| 3,418,812 A | * | 12/1968 | Khan | E21F 17/16 405/150.2 |
| 3,516,568 A | * | 6/1970 | Fish | B65D 88/76 220/560.04 |
| 3,701,262 A | * | 10/1972 | Connell | F17C 3/005 405/53 |
| 5,246,308 A | * | 9/1993 | Brothers | E04H 4/142 405/53 |

FOREIGN PATENT DOCUMENTS

| | | |
|---|---|---|
| DE | 3634325 A1 | 4/1988 |
| JP | 2017186018 A | 10/2017 |
| WO | 91/19931 A1 | 12/1991 |

OTHER PUBLICATIONS

International Search Report and Written Opinion dated Mar. 30, 2023 for Application No. PCT/US2022/080833.

* cited by examiner

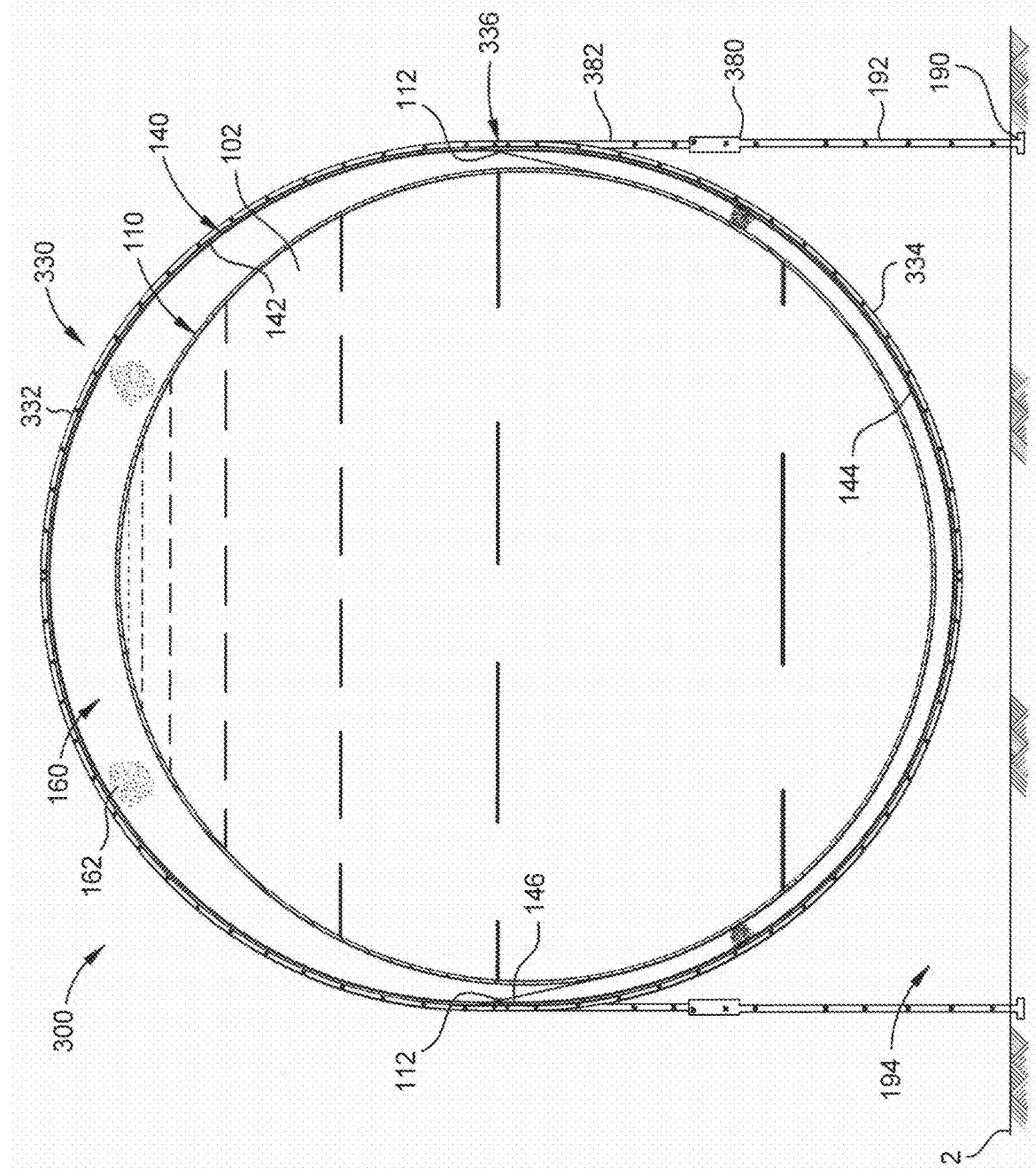

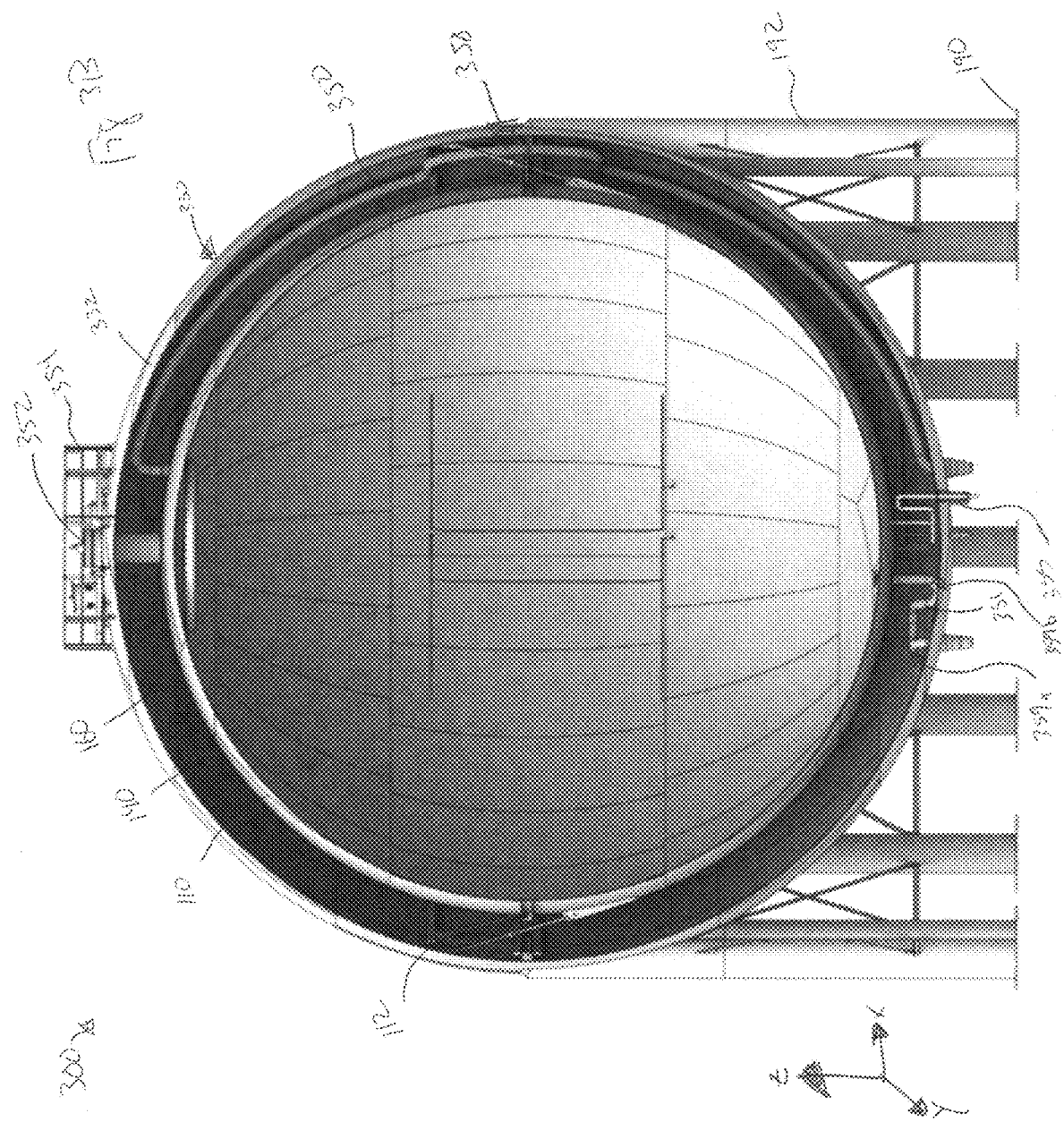

VACUUM INSULATED CRYOGENIC STORAGE VESSEL

CROSS-REFERENCE TO RELATED APPLICATIONS

This application claims priority to U.S. Provisional Application Ser. No. 63/285,898, filed Dec. 3, 2021, the contents of which are incorporated herein by reference in their entirety.

BACKGROUND

Field

Embodiments of the present disclosure generally relate to an insulated vessel to store a cryogenic material.

Description of the Related Art

Hydrogen is an energy source that is an alternative to conventional fossil fuels. For example, some modes of transportation, such as cars, are powered by hydrogen fuel cells. Hydrogen also has applications in other industrial applications, such as the Haber-Bosh process to produce fertilizer. As demand for hydrogen increases, due in part to the development of more efficient hydrogen powered vehicles and machines and consumer adoption thereof, there is a need to store hydrogen in industrial quantities.

Hydrogen gas has a low density. To efficiently store industrial quantities of hydrogen gas, the hydrogen gas is liquefied. However, liquefied hydrogen gas is extremely cold which places stress on its container. For example, the boiling point of liquefied hydrogen gas at one atmosphere of pressure is about −252.8° C. Liquid hydrogen is sufficiently cold to cause component gases in the air, such as nitrogen or oxygen gas, to condense and freeze in the presence of liquid hydrogen, such as on the walls of the vessel containing the liquid hydrogen. Condensing and freezing of an atmospheric gas transfers heat to the liquid hydrogen which causes the liquid hydrogen to boil-off. The boiled-off hydrogen gas may have to be vented, which results in losses. As a result, some liquid hydrogen containment vessels include a vacuum insulation to avoid heat loads caused by the condensation or freezing of an atmospheric gas.

Conventional liquid hydrogen storage vessels are formed from a double steel walled vessel with a vacuum insulation. The inner steel vessel wall storing the liquid hydrogen is suspended from the outer steel vessel wall. Insulation material is located between two vessel walls in a vacuum condition. However, these conventional thin steel walled liquid hydrogen storage vessels are limited in size due to the tendency of steel walls to buckle due to the vacuum load of the vacuum insulation.

Pre-stressed concrete vessels with internal steel liners are known in the nuclear industry and are used as containment vessels. However, these containment vessels are used to resist internal pressures in case of an accident and to protect the reactor from external hazards. To fulfill their intended purpose, nuclear containment vessels need to be either pre-stressed both longitudinally and circumferentially or have other means to resist high internal pressure which increases the manufacturing costs. Additionally, the bottom head of nuclear containment vessels is not at risk of buckling due to a vacuum load due to concrete within that supports equipment housed within the containment vessel. While a nuclear containment vessel may experience a vacuum, the air is not removed to create a significant vacuum condition, such as 1% atmospheric pressure or less, to efficiently store liquid hydrogen without heat losses caused by the freezing or condensing gases in the air. Unlike containment vessels known in the nuclear industry, liquid hydrogen storage vessels experience external loads caused by the atmosphere compressing the outer vessel due to the presence of a vacuum insulation within the liquid hydrogen storage vessel.

Patent RU-2437026 discloses a horizontal cylindrical vessel for storing liquefied natural gas inside a rectangular concrete vessel with an evacuated perlite insulation therebetween. But, RU-2437026 does not disclose an airtight liner to maintain the vacuum. Instead, RU-2437026 discloses an active system to maintain the vacuum by actively pumping out air. But, liquefied hydrogen gas is sufficiently cold that an active system to maintain a vacuum insulation around the inner vessel containing the liquid hydrogen is ineffective because the atmospheric gas can freeze or condense before the air can be removed by the active vacuum maintenance system. Liquefied natural gas is not sufficiently cold to cause air to freeze, which allows a vacuum insulation to be maintained in a manner described in RU-2437026.

The Space Power Facility at the Glenn Research Center has a space simulation chamber with a liner between two layers of concrete. The vacuum in the vacuum chamber is actively maintained through the use of pumps, including cryopumps. The Space Power Facility is not vacuum insulated, nor is does it contain an inner vessel to store liquid hydrogen. Additionally, concrete has a tendency to outgas due to its porosity and chemical reactions that occur within the concrete. A liner disposed between layers of concrete will not prevent outgassing into the vacuum insulation by the layer of concrete in communication with the vacuum insulation.

There is a need in the art for a more economical constructed cryogenic vessel capable of storing liquefied hydrogen at industrial quantities while handling the vacuum load caused by vacuum insulation. Liquefied hydrogen is not the only liquid gas with extremely low temperatures that causes air to freeze or condense, and there is also a need to be able to store these gases in a liquid state at industrial quantities.

SUMMARY

The present disclosure generally relates to a cryogenic vessel for storing a cryogenic material.

In one embodiment, a cryogenic vessel includes an outer vessel at least partially formed from a reinforced concrete. The cryogenic vessel further includes an inner vessel disposed in the outer vessel. The inner vessel has a rounded shape. The cryogenic vessel further includes an airtight liner disposed between the inner vessel and the outer vessel, wherein the liner is anchored to the outer vessel. The cryogenic vessel further includes a vacuum space disposed between the inner vessel and the liner, wherein an insulation material is disposed in the vacuum space.

In one embodiment, a cryogenic vessel includes an outer vessel at least partially formed from a reinforced concrete. The cryogenic vessel further includes an inner vessel disposed in the outer vessel. The inner vessel has a rounded shape. The cryogenic vessel further includes an inner liner configured to maintain a vacuum condition in a vacuum space between the inner vessel and the liner without an active vacuum condition maintenance system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

FIGS. 3A and 3B are cross-sectional views of an alternative embodiment of a cryogenic vessel.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
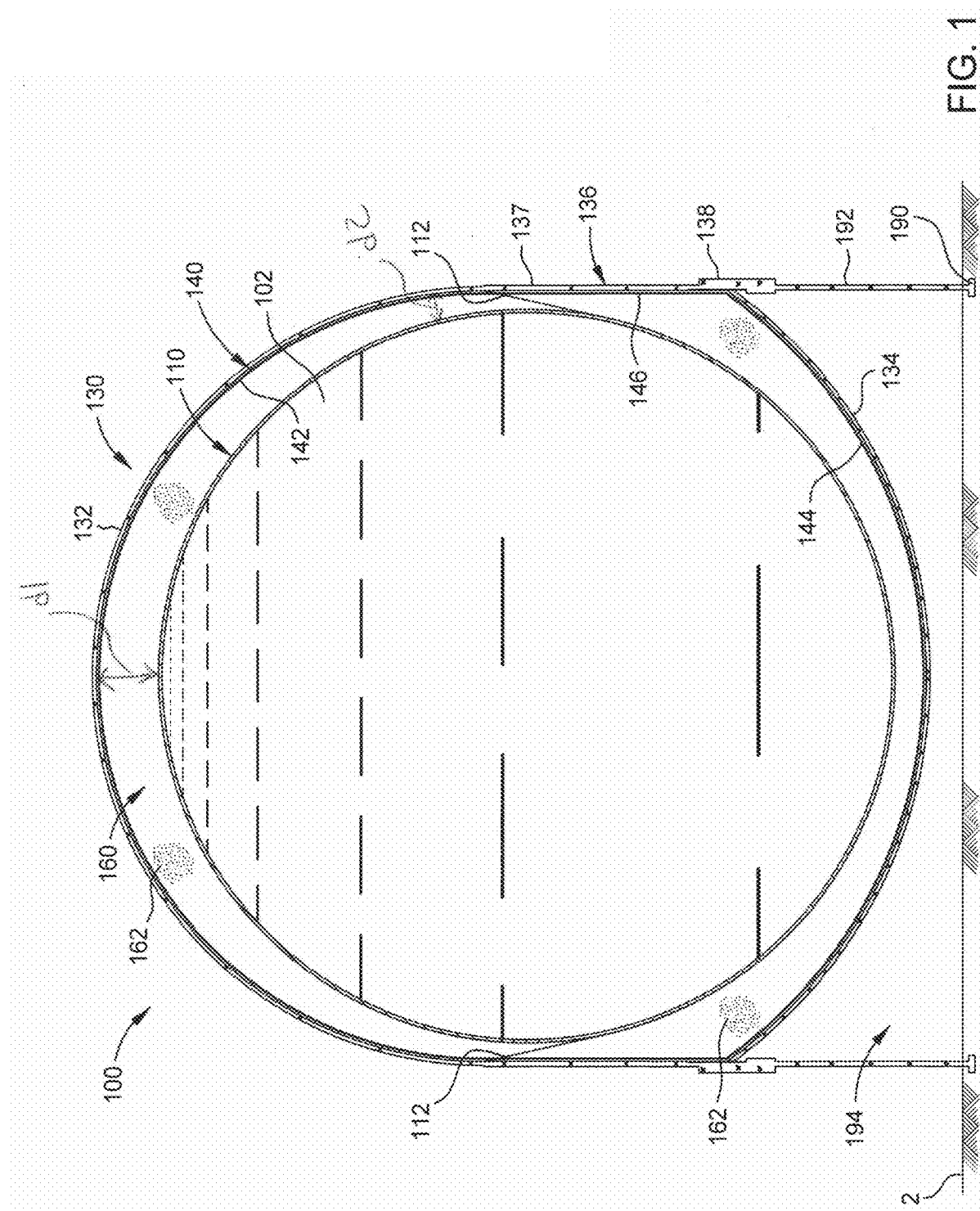
FIG. 1 is a cross-sectional view of a cryogenic vessel.

FIG. 1 illustrates an exemplary embodiment of a cryogenic vessel 100. The cryogenic vessel 100 includes an inner vessel 110, an outer vessel 130, and an inner liner 140. A vacuum space 160 is disposed between the inner vessel 110 and the liner 140. An insulation material 162 is placed within the vacuum space 160. The cryogenic vessel 100 also includes a foundation 190 and a support structure 192 which support the weight of the inner vessel 110, the outer vessel 130, and the contents stored therein.

The inner vessel 110 is disposed within the outer vessel 130. The inner vessel 110 is supported within the outer vessel 130 by supports 112. Cryogenic material 102, such as liquid hydrogen, may be stored within the inner vessel 110. The inner vessel 110 is leak-tight to contain the cryogenic material 102. The inner vessel 110 experiences extremely low temperatures associated with the stored cryogenic material 102, including cryogenic material 102 that boils-off. In some embodiments, the cryogenic material 102 is stored at pressure within the inner vessel 110. For example, the cryogenic material may be stored at about 90 psi. The inner vessel 110 may have a spherical shape as shown in FIG. 1, which has a smaller surface area per unit volume of other shapes which is advantageous in reducing heat transfer. However, the inner vessel 110 may have any suitable shape, such as a cylindrical shape with hemispherical, torispherical, ellipsoidal, or semi-ellipsoidal top and bottom heads. The use of generally rounded shapes, e.g., shapes that lack corners where adjacent plates are adjoined, facilitates the use of higher pressure storage. In contrast, conventional storage containers including "corners" where adjacent plates converge result in areas of relatively higher pressure at said corners. These corner areas thus become a limiting design constraint for internal pressure.

The vacuum space 160 is an evacuated space in which substantially all air is removed. In one example, a vacuum pump is used to remove the air. In some embodiments, the vacuum condition is about 1% of atmospheric pressure. In some embodiments, the vacuum condition is less than about 1% of atmospheric pressure, such as about less than 0.1% or 0.01% or 0.001% of atmospheric pressure. An insulation material 162, such as perlite or glass microspheres, is placed in the vacuum space 160 to further insulate the inner vessel 110 from the exterior of the cryogenic vessel 100. It is contemplated the insulation material 162 is placed in the vacuum space 160 prior to evacuation of the vacuum space 160. The airtight inner liner 140 maintains the pressure integrity of the vacuum space 160 to prevent the ingress of air. Some cryogenic materials 102, such as liquid hydrogen, cause component gases in the air, such as nitrogen or oxygen gas, to condense and/or freeze. Freezing or condensing atmospheric gas on the surface of the inner vessel 110 creates a heat load on the cryogenic material 102 as the cryogenic material 102 warms in response to the heat transfer to the cooling atmospheric gases on the outside of the inner vessel 110. The heat load causes some of the cryogenic material 102 to boil off as the cryogenic material 102 transitions from the liquefied state to an undesirable gaseous state within the inner vessel 110 due to the heat transfer. The gaseous cryogenic material 102 may be vented resulting in losses. In some instances, the gaseous cryogenic material 102 may be re-liquefied and returned to the inner vessel 110, but a reliquefaction process increases costs due to the expensive nature of liquefying hydrogen. Maintaining a vacuum and limiting the inflow of air into the vacuum space 160 limits and/or prevents the formation of frozen atmospheric gases on the surface of the inner vessel 110 which increases the efficiency of the cryogenic vessel 100. An active vacuum maintenance system, such as a vacuum pump, cannot be relied upon to maintain the vacuum condition in the vacuum space 160 because, in case of ingress of air, the air may freeze or condense in the presence of some cryogenic material 102 before the air can be pumped out.

The cryogenic vessel 100 is insulated by the vacuum condition in the vacuum space 160 and the insulation material 162, and the vacuum space 160 is hermetically sealed from the atmosphere by the liner 140. The vacuum condition in the vacuum space 160 is stable once the air is removed because the airtight liner 140 prevents the ingress of air into the vacuum space 160. The stable vacuum condition in the vacuum space 160 created by the airtight liner 140 allows for the cryogenic vessel 100 to efficiently store cryogenic material 102 with temperatures that are colder than the condensation point or freezing point of atmospheric gases because the stable vacuum condition inhibits the condensation or freezing of atmospheric gases on the inner vessel 100. Additionally, the liner 140 protects the vacuum space 160 from outgassing by the concrete in the outer vessel 130. These outgasses could condense or freeze on the inner vessel 110 if allowed to enter the vacuum space 160. No active vacuum system is necessary to maintain the stable vacuum condition in the vacuum space 160. An example of a cryogenic material 102 with a temperature sufficiently cold to cause condensation or freezing of component gases in the air is liquid hydrogen.

The inner vessel 110 is sized to store large quantities of cryogenic material 102, such as industrial quantities. In some embodiments, the inner vessel 110 is sized to receive the contents from one or more ships offloading cryogenic material 102. For example, the inner vessel 110 may have a storage volume of about 10,000 cubic meters or more, such as about 50,000 cubic meters or more, such as about 100,000 cubic meters or more, which exceeds the current largest liquefied hydrogen gas storage vessel having a gross volume of about 5,500 cubic meters being built in Cape Canaveral as of the date of filing this application. In some embodiments, the diameter of the spherical inner vessel 110 is about 61 meters or more. However, the inner vessel 110 may have a smaller storage volume based on cryogenic storage needs.

The inner vessel 110 may be made of steel or another material capable of maintaining a leak-tight containment of the cryogenic material 102. The inner vessel 110 may have any suitable thickness to contain the cryogenic material. For example, the inner vessel 110 may be made of steel plates that are welded together.

The supports 112 may also be made of steel, such as being formed in or welded onto the plates forming the inner vessel 110 at one end. The other end of the support 112 may be attached to the outer vessel 130. The supports 112 are applied after the bottom half of the inner vessel 110 is constructed, but before the top half of the inner vessel 110 is constructed, to allow for positioning of the inner vessel 110 into the outer vessel 130.

In one example, the spacing between the inner vessel 110 and the outer vessel 130 at an upper end thereof (e.g., distance d1) is greater than the distance approximate the equators thereof (e.g., distance d2). The greater distance d1 allows for the placement of additional insulating material between the top of the inner vessel 110 and the top of the outer vessel 130. This allows for settling of insulation material—particularly in response to cooling of the inner vessel 130—while still maintaining sufficient insulation at the upper end of the cryogenic vessel 100.

The outer vessel 130 houses the inner vessel 110. Because the vacuum space 160 is evacuated, a vacuum load is placed on the outer vessel 130 which places the outer vessel 130 in compression. The outer vessel 130 is placed in compression due to the vacuum condition in the vacuum space 160 because the atmosphere is applying a force to the outer surface of the outer vessel 130 while there is substantially no gas applying an opposing force to the interior surface of the liner 140 that is anchored to the outer vessel 130.

The outer vessel 130 and liner 140 are sized to accommodate the inner vessel 110 while maintaining a vacuum space 160 between the inner vessel 110 and the liner 140. The spacing between the inner vessel 110 and the liner 140 and outer vessel 130 may be selected to minimize the boil-off rate of the cryogenic material 102 when the vacuum space 160 is under a vacuum condition. In some embodiments, the distance between the inner vessel 110 and the liner 140 is about 1 meter or about 2 meters at the closest point. The liner 140 may be attached to the outer vessel 130 by a plurality of fasteners. In such an example, the fasteners may be welded to the external surface of the liner 140. The fasteners may include a post with a cap.

The outer vessel 130 is formed from concrete, such as reinforced concrete, and can have any thickness sufficient to resist compressive loads due to the vacuum condition without failure or buckling. When forming the outer vessel from concrete, the concrete can be poured around fasteners attached to the liner 140 to facilitate coupling therewith. Concrete is a material capable of handling compression loads, such as vacuum loads. A concrete, such as reinforced concrete, is less prone to buckling than a steel vessel in response to a vacuum load. In addition to having desirable compression load resistance, concrete is also a relatively inexpensive construction material as compared to steel which would need to have a sufficient thickness to avoid buckling under the vacuum load. Additionally, construction time is reduced by constructing the outer vessel 130 from concrete as opposed to steel. Steel reinforcement in the concrete allows the outer vessel 130 to handle small tensile stresses and also mitigates cracking due to shrinkage and temperature changes. Some outer vessel 130 geometries may experience tensile stresses in the structure where abrupt changes in the outer vessel geometry cause bending and tension forces under a vacuum load. These forces may be accommodated by using a pre-stressed or post-tensioned concrete at that portion of the outer vessel 130. Concrete can be placed by pouring into formwork or using a shotcrete (gunite) application on curved or overhead surfaces during the construction of the cryogenic vessel 100. The outer vessel 130 can be made from, or partially from, a pre-stressed or post-tensioned concrete depending on the expected loads and shape of the outer vessel 130. Unlike a nuclear containment vessel, the outer vessel 130 does not need to be pre-stressed both longitudinally and circumferentially due to the design considerations of the outer vessels 130 shape and the intensity of the vacuum load. Additionally, a cylindrical, torical, or spherical shape is more effective at handling stresses and tensile loads associated with a vacuum condition than a rectangular vessel as described in RU-2437026.

As shown in FIG. 1, the outer vessel 130 is a cylindrical vessel with a top head 132, a bottom head 134, and an intermediate section 136. The shape of the top head 132 and bottom head 134 preferably follows the shape of the corresponding portion of the inner vessel 110 to reduce the amount of insulation material 162 needed to fill the vacuum space 160 and for constructability. As shown in FIG. 1, the top head 132 is a hemispherical head. As shown in FIG. 1, the bottom head 134 is a spherical dome with a radius greater than the radius of the top head 132. And, as shown in FIG. 1, the bottom head 134 is inverted with respect to the top head 132. The intermediate section 136 is a hollow cylinder.

The cryogenic vessel 100 includes the internal airtight liner 140 to seal the vacuum space 160 from the surrounding atmosphere to maintain the stable vacuum condition within the vacuum space 160. The liner 140 has a shape corresponding to the shape of the outer vessel 130. As shown in FIG. 1, the vacuum space 160 is between the liner 140 and the inner vessel 110. The liner 140 may be anchored to the outer vessel 130 by a plurality of anchors. The anchors may be welded to the liner 140. In some embodiments, the anchors are made of steel. Concrete may be poured over the anchors during the construction of the outer vessel 130.

In some embodiments, the liner 140 may be made of steel. For example, the liner 140 may be a steel liner that is 1.75 inches or less in thickness. In some embodiments, the liner 140 has a thickness between about 0.25 inches and 0.75 inches. In some embodiments, the inner vessel 110 may be formed from steel plates that are welded together, such as by butt-welding or double-lap welding. Fabricating the inner vessel from steel having a thickness of 1.75 inches or less decreases material cost as compared with a thicker steel liner and also avoids the cost of heat treating welds as required with steel that exceeds a thickness of 1.75 inches at the welds. However, the liner 140 may be made from another suitable metallic material or other material with properties capable of maintaining pressure integrity of the cryogenic material 102 at extremely low temperatures.

Figure 2:
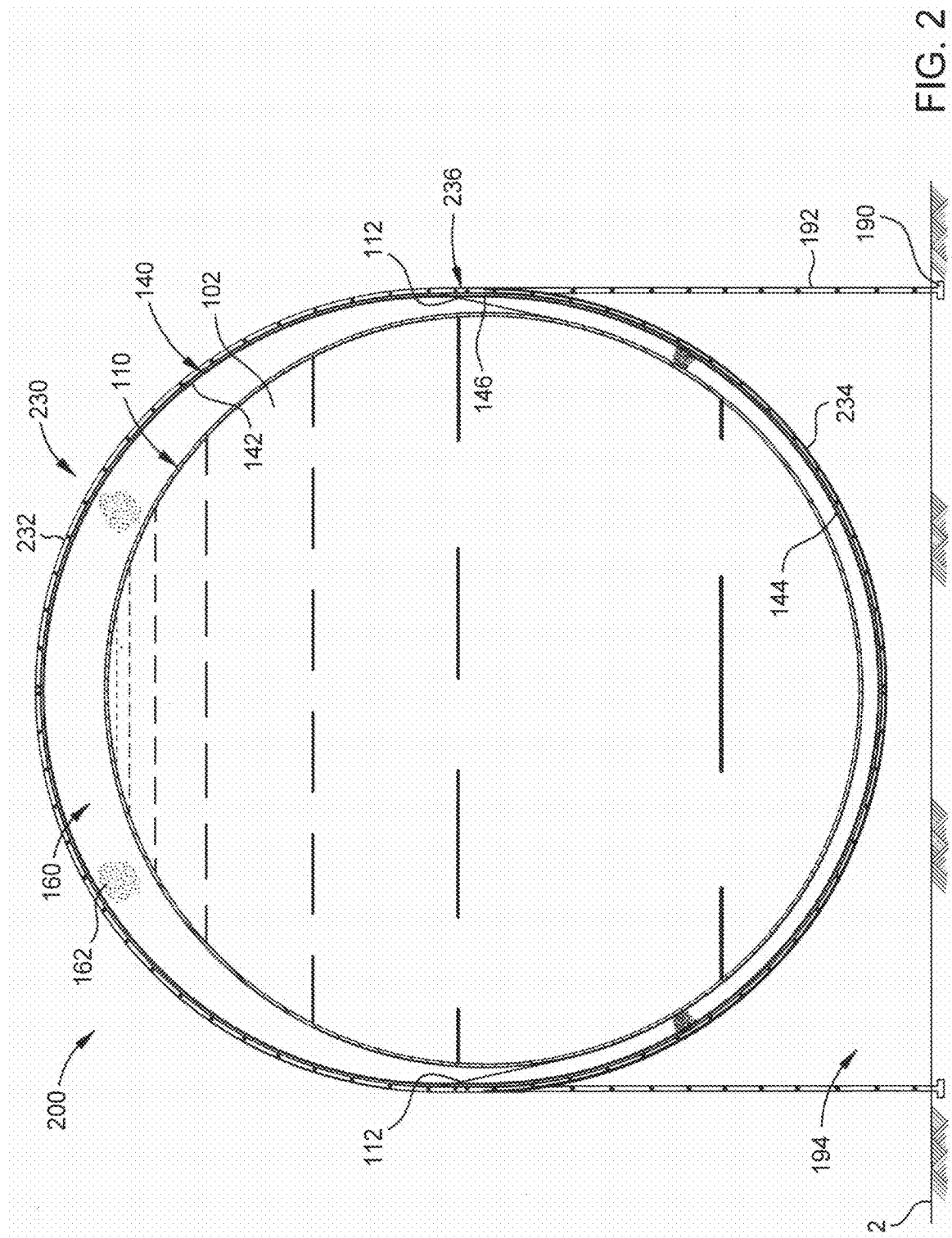
FIG. 2 is a cross-sectional view of an alternative embodiment of a cryogenic vessel.

As show in FIG. 1, the liner 140 includes a top head liner 142, a bottom head liner 144, and an intermediate section liner 146. The top head liner 142 is connected to the top head 132. The bottom head liner 144 is connected to the bottom head 134. The intermediate section liner 146 is connected to the intermediate section 136. In some embodiments, the liner 140 is anchored to the outer vessel by anchors. In some embodiments, the liner 140 is bonded to the outer vessel 130. The supports 112 may be attached to the liner 140 or extend through the liner 140 to connect to the reinforced concrete of the outer vessel 130. The internal liner 140 attached to the concrete provides leak tightness, transfers vacuum load to the reinforced concrete outer vessel 130 which provides structural resistance, and allows the stable vacuum condition to be maintained within the vacuum space 160. Depending on the thickness of the liner 140, the liner 140 weld details, and the liner 140 anchorage arrangement, the liner 140 may also contribute to the structural resistance of the outer vessel 130. An intermediate section liner 146 may be omitted in embodiments of the outer vessel 130 that do not include an intermediate section 136. The intermediate section 136 allows the bottom head 134 and bottom head liner 144 to intersect with the wall section 138 at an angle rather than at a tangent (such as is shown in FIG. 2). It is contemplated that the intersection at an angel rather than tangent facilitates ease of construction and/or maintenance.

The top head 132 and the bottom head 134 are connected to the intermediate section 136. The intermediate section 136 includes a first wall section 137 and a second wall section 138. As shown in FIG. 1, the bottom head 134 is connected to the second wall section 138. The outer vessel 130 is connected to the support structure 192 by the second wall section 138. The first wall section 137 may be formed from a reinforced concrete and the second wall section 138 may be formed from a pre-stressed or post-tensioned concrete to support the bottom head 134 which is subject to a vacuum load. Due to the shape of the bottom head 134 as shown in FIG. 1, the second wall section 138 experiences high local tension due to the vacuum load on the bottom head 134, and the post-tensioned or pre-stressed concrete is capable of handling the tension. Additionally, the second wall section 138 may be made from a pre-stressed or post-tensioned concrete to support the weight of the cryogenic material 102, the inner vessel 110, the outer vessel 130, and the insulation material 162.

While the liner 140 maintains an airtight barrier between the atmosphere and the vacuum space 160, the outer vessel 130 may protect the inner vessel 110 and liner 140 from exterior hazards, such as wind, storms, fire, projectiles, or the failure of an adjacent cryogenic vessel. Protecting the inner vessel 110 from exterior hazards is desirable because the inner vessel 110 may be pressurized and the cryogenic material 102 therein may be flammable.

In some embodiments, the foundation 190 is a concrete foundation. As shown in FIG. 1, the foundation 190 is a concrete ring wall. The ring wall may be at least partially disposed in a ground 2. In some embodiments, the foundation 190 may be a concrete slab. In some embodiments, the support structure 192 is a concrete skirt as shown in FIG. 1 supported by the foundation 190. The second wall section 138 is connected to the support structure 192 as shown in FIG. 1. In some embodiments, the support structure 192 is a plurality of concrete columns, such as reinforced concrete columns, supported by the foundation 190 which may be a plurality of footings for each concrete column. The support structure 192 facilitates use of "rounded" structures, which eliminates the use of structures having sharp "corners" at adjoining components. The inclusion of "corners" limits the pressure ranges which can be achieved by a particular design. Such constraints are mitigated in designs of the present disclosure.

A space 194 is formed underneath the bottom head 134 and within the support structure 192. The space 194 may be in communication with the atmosphere, which subjects the bottom head 134 to a vacuum load.

One or more ports may be made in the inner vessel 110 to facilitate injection and removal of the cryogenic material 102. One or more boil off ports may be formed near the top of the inner vessel 110 to facilitate the removal of cryogenic material 102 that has returned to a gas state (boiled off). Conduits may extend through the outer vessel 130, the liner 140, and connect to the one or more ports formed in the inner vessel 110.

In some embodiments, the cryogenic vessel 100 is at least partially constructed from pre-fabricated pieces, such as pre-fabricated concrete sections for the outer vessel 130.

In some embodiments, the inner vessel 110, outer vessel 130, and liner 140 are constructed together, with the steel reinforcement cage and the airtight liner 140 built around the inner vessel 110. The concrete may be added to the steel reinforcement cage during or after the construction of the inner vessel 110.

Once the inner vessel 110 is complete, it may be pressure tested to confirm that the inner vessel 110 is leak-tight. Once the liner 140 is complete, the liner 140 may be tested to confirm that the liner 140 is not leaking.

Once the inner vessel 110, outer vessel 130, and liner 140 are complete, the vacuum space 160 is evacuated and filled with insulation material 162. In some embodiments, the vacuum space 160 is evacuated after the installation of insulation material 162. After the vacuum space 160 is evacuated, the vacuum space 160 is sealed. An active vacuum maintenance system is not necessary to maintain a stable vacuum condition in the vacuum space 160.

Once the cryogenic vessel 100 is constructed, the inner vessel 110 may be filled with cryogenic material 102. The residual air in the vacuum space 160 that was not evacuated may freeze or condense in response to the cryogenic material 102, but the airtight seal of the liner 140 anchored to the outer vessel 130 inhibits additional buildup of this condensate or frozen atmospheric gas. The introduction of the cryogenic material 102 into to the inner vessel 110 causes the inner vessel 110 to contract, and the supports 112 and the outer vessel 130 are designed to accommodate this contraction.

FIG. 2 illustrates and alternative embodiment of a cryogenic vessel 200. Cryogenic vessel 200 is similar to cryogenic vessel 100 and has similar components as cryogenic vessel 100, and the similar components are identified using similar reference signs. Cryogenic vessel 200 also has identical components as cryogenic vessel 100, and these components are identified using the same reference signs.

Cryogenic vessel 200 includes an inner vessel 110, an outer vessel 230, and a liner 140. A vacuum space 160 is disposed between the inner vessel 110 and the liner 140, and an insulation material 162 is placed within the vacuum space 160. The cryogenic vessel 200 also includes a foundation 190 and a support structure 192 which support the weight of the inner vessel 110, the outer vessel 230, and the contents stored therein. Cryogenic vessel 200 is constructed out of similar materials as the cryogenic vessel 100 and has similar properties that are advantageous in storing cryogenic materials 102 colder than the condensation point or freezing point of atmospheric gases.

As shown in FIG. 2, the outer vessel 230 is spherical in shape and the inner vessel 110 is spherical in shape. The outer vessel 230 has a hemispherical top head 232, a hemispherical bottom head 234, and a hollow cylindrical intermediate portion 236. An inner airtight liner 140 is anchored to the outer vessel 230. The liner 140 seals the vacuum space 160 from the atmosphere to maintain a stable vacuum condition within the vacuum space 160. The liner 140 includes a top head liner 142 connected to the hemispherical top head 232, a bottom head liner 144 connected to the hemispherical bottom head 234, and an intermediate section liner 146 connected to the hollow cylindrical intermediate portion 236. The liner 140 may be anchored to the outer vessel 230 by anchors. The inner vessel 110 is supported by the outer vessel 230, and the inner vessel 110 may be attached to the outer vessel 230 by supports 112. The spherical shape of the outer vessel 230 does not experience high tension loads due to the vacuum load caused by the vacuum condition in the vacuum space 160. The vacuum loads experienced by the top head 232 and the bottom head 234 are transferred tangentially to the cylindrical intermediate section 236. As a result, the top head 232, the bottom head 234, and the intermediate section 236 are formed from reinforced concrete, and there is no need for portions to be made from pre-stressed concrete. However, some embodiments of a spherical outer vessel 230 may benefit from portions of the outer vessel being formed from a pre-stressed concrete or a post-tensioned concrete to handle high local tensile stresses.

The cryogenic vessel 200 is insulated by the vacuum condition in the vacuum space 160 and the insulation material 162. The stable vacuum condition in the vacuum space 160 created by the airtight liner 140 allows for the cryogenic vessel 200 to efficiently store cryogenic material 102 that is colder than the condensation point or freezing point of atmospheric gases because the stable vacuum condition inhibits the condensation or freezing of atmospheric gases on the inner vessel 110. An active vacuum maintenance system is not necessary to maintain the stable vacuum condition in the vacuum space 160.

While the airtight liner 140 maintains the airtight barrier between the atmosphere and vacuum space 160, the outer vessel 230 may protect the inner vessel 110 and the liner 140 from exterior hazards.

The outer vessel 230 is supported by the support structure 192. As shown in FIG. 2, the support structure 192 is a support skirt made from concrete. The support skirt 192 may engage the intermediate section 236 at one end and the foundation 190 at the other end. A space 194 may be present underneath the bottom head 234 and disposed in the support structure 192. This space 194 may be in communication with the surrounding atmosphere, subjecting the bottom head 234 to a vacuum load.

Similar to the cryogenic vessel 100, the cryogenic vessel 200 may have conduits (not shown) extending through the outer vessel 230, the liner 140, and connect to the one or more ports formed in the inner vessel 110.

The cryogenic vessel 200 may be constructed in a similar manner as the vessel 100.

FIGS. 3A and 3B illustrates an alternative cryogenic vessel 300.

Cryogenic vessel 300 is similar to cryogenic vessels 100, 200 and has similar components. The similar components are identified using similar reference signs. Cryogenic vessel 300 also has identical components as cryogenic vessels 100, 200, and these components are identified using the same reference signs.

Cryogenic vessel 300 includes an inner vessel 110, an outer vessel 330, and an inner liner 140. A vacuum space 160 is disposed between the inner vessel 110 and the liner 140, and an insulation material 162 is placed within the vacuum space 160. The cryogenic vessel 300 also includes a foundation 190 and a support structure 192. Additionally, the cryogenic vessel 300 includes a ring beam 380 and a second support structure 382. The foundation 190, support structure 192, ring beam 380, and second support structure 382 support the weight of the inner vessel 110, the outer vessel 330, and the contents stored therein. Cryogenic vessel 300 is constructed out of similar materials as the cryogenic vessels 100, 200 and has similar properties that are advantageous in storing cryogenic materials 102 colder than the condensation point or freezing point of atmospheric gases.

As shown in FIG. 3, the inner vessel 110 is spherical in shape. The outer vessel 330 is spherical in shape with a hemispherical top head 332, and a hemispherical bottom head 334, and a hollow cylindrical intermediate section 336. The inner airtight liner 140 seals the vacuum space 160 from the atmosphere to maintain a stable vacuum condition within the vacuum space 160. The liner 140 includes a top head liner 142 connected to the hemispherical top head 332, a bottom head liner 144 connected to the hemispherical bottom head 334, and an intermediate section liner 146 connected to the intermediate section 336. The liner 140 may be anchored to the outer vessel 330 by a plurality of anchors. The inner vessel 110 is supported by the outer vessel 330, and the inner vessel 110 may be attached to the outer vessel 330 by supports 112. The spherical shape of the outer vessel 330 does not experience high tension loads due to the vacuum load caused by the vacuum condition in the vacuum space 160. The vacuum loads experienced by the top head 332 and the bottom head 334 are transferred tangentially to the cylindrical intermediate section 336. As a result, the top head 332, the bottom head 334, and the intermediate section 336 are formed from reinforced concrete, and there is no need for portions to be made from pre-stressed concrete. However, some embodiments of a spherical outer vessel 330 may require portions of the outer vessel to be formed from a pre-stressed concrete or a post-tensioned concrete to handle high local tensile stresses.

The cryogenic vessel 300 is insulated by the vacuum condition in the vacuum space 160 and the insulation material 162. The stable vacuum condition in the vacuum space 160 created by the liner 140 allows for the cryogenic vessel 300 to efficiently store cryogenic material 102 that is colder than the condensation point or freezing point of atmospheric gases because the stable vacuum condition inhibits the condensation or freezing of atmospheric gases on the inner vessel 110. An active vacuum maintenance system is not necessary to maintain a stable vacuum condition in the vacuum space 160. The outer vessel 330 may protect the inner vessel 110 and liner 140 from exterior hazards.

As shown in FIG. 3, the support structure 192 is a plurality of concrete columns engaged at a lower end with the foundation 190 and at an upper end with the ring beam 380. The concrete columns 192 may be made of reinforced concrete. The ring beam 380 may be made of reinforced concrete. The foundation 190 may be a plurality of concrete footings in the ground 2 corresponding to a respective concrete column 192. The second support structure 382 may be a concrete skirt or a plurality of concrete columns. The second support structure engages the outer vessel 330 and the ring beam 380. The second support structure 382 may engage the intermediate section 336 at one end. A space 194 may be present underneath the bottom head 334 and disposed in the support structure 192. The space 194 is in communication with the surrounding atmosphere due to the gaps in the columns, which subjects the bottom head 334 to vacuum loads.

Similar to the cryogenic vessel 100, the cryogenic vessel 300 may have conduits (not shown) extending through the outer vessel 330 and connect to the one or more ports formed in the inner vessel 110.

The cryogenic vessel 300 may be constructed in a similar manner as the vessel 100 or cryogenic vessel 200.

FIG. 3B illustrates additional details related to vacuum systems, fluid removal, and personnel access, which are also applicable to cryogenic vessels 100 and 200. For example, the cryogenic vessel 300 includes a conduit 350 for extracting gas-phase stored material (e.g., "boil off"). The conduit is fluidly coupled to an upper end of the inner vessel 110 at a first end thereof, while a second end of the conduit 350 is coupled to a port at a lower end of the outer vessel 140. The conduit is run within the vacuum insulation space 160 from the upper end of the inner vessel 110 to the port in the lower end of the outer vessel 140. The relatively large travel distance of the conduit 350 reduces the intensity of thermal gradient along the conduit 350, thereby minimizing heat transfer from the exterior of the outer vessel 140 to the inner vessel 110. In addition, pipe loop 358, where the conduit 350 turns 90 degrees to travel in the x-y plane, then turns 90 degrees travel in the x-y plane, and then turns 90 degrees again to travel in the x-y plane once more before finally returning to initial path in a final 90 degree turn, provides flexibility to reduce forces generated due to the thermal contraction of inner vessel 110 relative to outer vessel 140 when inner vessel 110 is filled with cryogenic material.

In addition, the cryogenic vessel 300 includes a second conduit 351 to remove liquid phase product from the inner vessel 110. The second conduit 351 is coupled to a bottom of the inner vessel 110 (so as to be gravity fed) at a first end thereof, and coupled to a second port in the bottom of the outer vessel 140 at a second end thereof. As illustrated, the conduit 351 is non-linear between the inner vessel 110 and the port in the outer vessel 140. The non-linear (e.g., serpentine) shape of the conduit 351 increases the overall length of the conduit 351, which reduces heat transfer along the conduit 351 to the inner vessel 110. Moreover, loops 359a, 359b within the conduit provide flexibility to reduce forces generated due to thermal contraction of the inner vessel 110 relative to the outer vessel 140 when inner vessel 110 is filled with cryogenic material, as similarly described above with respect to pipe loop 358.

The cryogenic vessel 300 also includes an access port 352 at an upper end of the outer vessel 140. The access port 352 provides access to the interior of the outer vessel 140 (e.g., vacuum insulation space 150), and optionally, to the interior of the inner vessel 140. An optional secondary access port 353 is positioned at an upper end of the outer vessel 140 adjacent the access port 352, and within the perimeter of a gate 354. The secondary access port 353 may be used for applying vacuum pressure to the vacuum insulation space 160, for applying insulating material to the vacuum insulation space 160, or for other access to the vacuum insulation space 160.

The cryogenic vessel 300 also includes a metrology unit 355 disposed at a bottom of the outer vessel 140 and coupled to the inner vessel 110. The metrology unit 355 facilitates the collection of data related to operation of the cryogenic vessel 300, such as temperatures, pressures, masses/volumes, and the like. It is contemplated that other operational data may additionally be collected.

As noted above, while the above features are described with respect to cryogenic vessel 300, it is contemplated that these features are likewise included within cryogenic vessels 100 and 200, except where explicitly excluded.

In some embodiments, the cryogenic vessels 100, 200, 300 may have their exterior painted. In some embodiments, the outer vessel 130, 230, 330, are coated with a sealant to enhance the airtight seal. In some embodiments, the cryogenic vessel includes an inner liner 140 and an outer liner to enhance the airtight seal. The outer liner may be anchored to the exterior of the outer vessel. In some embodiments, the exterior of the outer vessel 130, 230, 330 may be coated with a reflective material to reduce the heat load on the respective cryogenic vessel 100, 200, 300 from solar energy or other radiative forms of heat transfer.

In some embodiments, the shape of the outer vessel is selected such that the outer vessel is only formed from reinforced concrete.

In some embodiments, the shape of the outer vessel benefits from portions of the outer vessel being formed from reinforced concrete and other portions experiencing high tensile loads being formed from a pre-stressed concrete or a post-tensioned concrete.

In some embodiments, the top head and the bottom head of the outer vessel have the same shape. In some embodiments, the top head and bottom head of the outer vessel have different shapes. The shape of the top and bottom heads of the outer vessel may be hemi-spherical, spherical dome, ellipsoidal, semi-ellipsoidal, torispherical, or any combination thereof.

The outer vessel may be spherical, ellipsoidal, or torical. The inner vessel may be spherical, ellipsoidal, torical, or any combination thereof.

In some embodiments, the outer vessel is a cylindrical vessel with top and bottom heads with an intermediate section in between. The shape of the top and bottom heads of the outer vessel may be hemi-spherical, spherical dome, ellipsoidal, semi-ellipsoidal, torispherical, or any combination thereof.

In some embodiments, a spherical dome is a portion of a sphere.

In some embodiments, the outer vessel is a sphere with top and bottom hemispherical heads without an intermediate section in between the top and bottom heads.

In some embodiments, the length of the intermediate section of the outer vessel is sized to ensure a sufficient space between the top head and an upper portion of the inner vessel to allow a reservoir of insulation material to be added into the vacuum space. When the cryogenic material 102 is added into the inner vessel, the inner vessel will contract, which will cause the insulation material to settle around the inner vessel. This reservoir of insulation material above the inner vessel accommodates the settling while preventing a part of the upper portion of the inner vessel from being uncovered by the settling insulation material.

In some embodiments, the outer vessel and inner vessel are both spheres.

In some embodiments, the shapes of the top head and the bottom head of the outer vessel are selected to optimize the amount of insulation material 162 placed in the vacuum space 160.

In some embodiments, the gap between the outer wall of the inner vessel and the inner wall of the outer vessel is selected to increase the amount of insulation material 162 underneath the inner vessel.

In some embodiments, the liner 140 is a double walled liner.

In some embodiments, the support structure may be omitted and the cryogenic vessel may be supported directly by a foundation dug into the ground 2 such that at least a portion of the cryogenic vessel may be at least partially disposed in the ground 2.

In some embodiments, the cryogenic material 102 is liquid hydrogen. However the cryogenic material may be liquid helium, liquid oxygen, liquid nitrogen, other liquefied gas, or other liquid that has a temperature lower than a condensation point of a component gas of atmospheric air.

In some embodiments, the inner vessel 110 has stiffeners to enhance the strength and pressure integrity of the inner vessel 110.

In one embodiment of the cryogenic vessel, the cryogenic vessel comprises an outer concrete vessel including a top head, a bottom head, and a liner. The cryogenic vessel further comprises an inner steel vessel disposed in the outer vessel. The liner has a thickness of less than 1.75 inches. Liquid hydrogen is storable within the inner vessel.

The cryogenic vessel further comprises a plurality of supports attaching the inner vessel to the outer vessel. The cryogenic vessel further comprises a vacuum space disposed between the liner and the inner vessel, wherein the vacuum space is in a stable vacuum condition. An insulation material is disposed in the vacuum space.

In one embodiment, a cryogenic vessel comprises an outer concrete vessel and a steel inner vessel. The steel inner vessel is disposed in the outer vessel. A cryogenic material is storable within the inner vessel. The cryogenic vessel further comprises a vacuum space disposed between the inner vessel and a liner anchored to the outer vessel, wherein the vacuum space is in a stable vacuum condition.

The liner 140 may have a shape conforming to the outer vessel, such at the top and bottom heads of the outer vessel.

In some embodiments, the cryogenic material 102 is stored within the inner vessel at a pressure between 0 psi and 90 psi or at a pressure that exceeds 90 psi. In some embodiments, the cryogenic material 102 is stored within the inner vessel at a pressure between about 30 psi and about 50 psi. In some embodiments, the cryogenic material is stored within the inner vessel at atmospheric pressure.

In some embodiments, the liner 140 may be made of steel having a thickness that exceeds 1.75 inches. In some embodiments, the steel liner 140 has a thickness of about 0.25 inches, 0.5 inches, or 0.75 inches.

In some embodiments, the liner 140 may be made of stainless steel.

In some embodiments, the outer vessel is partially made from a reinforced concrete and from a pre-stressed or post-tensioned concrete. In some embodiments, the top or bottom head of the outer vessel may be made of a material other than concrete, such as steel while the other head is at least partially formed from a concrete. In some embodiments, the outer vessel is made from a reinforced concrete, a pre-stressed, and a post-tensioned concrete.

In some embodiments, the entire outer vessel is made of a reinforced concrete.

In some embodiments, the liner 140 maintains the stable vacuum condition in the vacuum space 160 until the cryogenic vessel is decommissioned.

In one embodiment the cryogenic vessel includes an outer vessel at least partially formed from a reinforced concrete, the outer vessel including an interior surface. The cryogenic vessel further includes an inner vessel disposed in the outer vessel. The cryogenic vessel further includes an inner liner disposed on the interior surface of the outer vessel, wherein the inner liner is configured to maintain a vacuum condition in a vacuum space between the inner vessel and the liner without an active vacuum condition maintenance system.

In one embodiment, a cryogenic vessel comprises an outer vessel formed from a reinforced concrete. The outer vessel further including an airtight liner. The cryogenic vessel further includes an inner steel vessel disposed in the outer vessel. The cryogenic vessel further includes a vacuum space disposed between the outer vessel and the inner vessel. An insulation material is disposed in the vacuum space.

In one embodiment, a cryogenic vessel includes an outer concrete vessel that includes a top head and a bottom head. The top head and the bottom head are formed from a reinforced concrete. The outer concrete vessel further includes an internal airtight liner. The cryogenic vessel further comprises an inner steel vessel disposed in the outer vessel. The cryogenic vessel further includes a plurality of supports attaching the inner vessel to the outer vessel. The cryogenic vessel further includes a vacuum space disposed between in outer vessel and the inner vessel. An insulation material is disposed in the vacuum space.

While embodiments herein are described with respect to rounded or spherical inner vessels, it is contemplated that other shapes may be utilized. For example, cylindrical tanks with radiused (e.g., rounded) corners may be utilized. For example, non-cylindrical shapes with rounded corners may be utilized when operating at pressures less than 2 bar, such as 700 millibar, such as 300 millibar or less. In other examples, it is contemplated that vessels with sharp corners (e.g., approximately 90 degrees) may be utilized when additional support is provided via reinforcement, or when operating at relatively low pressures, such as below 300 millibar.

While the foregoing is directed to embodiments of the present disclosure, other and further embodiments of the disclosure may be devised without departing from the basic scope thereof, and the scope thereof is determined by the claims that follow.

What is claimed is:

1. A cryogenic vessel, comprising:
   an outer vessel at least partially formed from a reinforced concrete;
   an inner vessel disposed in the outer vessel, wherein the inner vessel is spherical;
   an airtight liner disposed between the inner vessel and the outer vessel, wherein the liner is anchored to an inside surface of the outer vessel and formed of a metallic material;
   a vacuum space disposed between the inner vessel and the liner, wherein an insulation material is disposed in the vacuum space; and
   a plurality of supports attached to the outer vessel, wherein the plurality of supports support the inner vessel and spaces the inner vessel from the outer vessel.

2. The cryogenic vessel of claim 1, wherein the outer vessel comprises a hemispherical top head, a hemispherical bottom head, and a cylindrical intermediate section.

3. The cryogenic vessel of claim 2, wherein the intermediate section includes a first wall section and a second wall section, wherein the first wall section is formed from a reinforced concrete and the second wall section is formed from a pre-stressed or post-tensioned concrete, and wherein the bottom head is attached to and supported by the second wall section.

4. The cryogenic vessel of claim 3, wherein the top head and the bottom head are formed from the reinforced concrete and the bottom head is attached to the second wall section at a non-tangent angle.

5. The cryogenic vessel of claim 1, wherein the outer vessel is a spherical vessel.

6. The cryogenic vessel of claim 5, further comprising:
   a foundation;
   a ring beam;
   a first plurality of columns between the foundation and the ring beam; and
   a concrete skirt between the ring beam and the outer vessel.

7. The cryogenic vessel of claim 1, wherein the inner vessel has a storage volume of about 10,000 cubic meters or more.

8. The cryogenic vessel of claim 1, wherein the insulation material is at least one of a plurality of perlite or a plurality of glass microspheres.

9. The cryogenic vessel of claim 1, wherein the inner liner is anchored to the outer vessel by a plurality of anchors.

10. The cryogenic vessel of claim 1, wherein the liner has a thickness of less than 1.75 inches.

11. The cryogenic vessel of claim 10, wherein the thickness of the liner is between about 0.25 inches and about 0.75 inches.

12. The cryogenic vessel of claim 1, wherein the liner maintains a pressure of about 1% or less of atmospheric pressure in the vacuum space.

13. The cryogenic vessel of claim 1, wherein the liner is a steel liner.

14. The cryogenic vessel of claim 1, wherein the supports are made of steel and welded to the plates forming the inner vessel.

15. A cryogenic vessel, comprising:
an outer vessel at least partially formed from a reinforced concrete;
an inner vessel disposed in the outer vessel, the inner vessel having a spherical shape;
an inner liner configured to maintain a vacuum condition in a vacuum space between the inner vessel and the liner without an active vacuum condition maintenance system; and
a plurality of supports attached to the outer vessel, wherein the plurality of supports support the inner vessel and spaces the inner vessel from the outer vessel.

16. The cryogenic vessel of claim 15, wherein the outer vessel is a spherical vessel formed from a reinforced concrete.

17. The cryogenic vessel of claim 15, wherein the outer vessel is a cylindrical vessel including a top head and a bottom head, and wherein the top head and bottom head are a hemi-spherical head, an ellipsoidal head, a semi-ellipsoidal head, a torispherical head, a spherical dome, or any combination thereof.

18. The cryogenic vessel of claim 15, wherein the outer vessel includes an intermediate section including a section of pre-stressed or post-tensioned concrete that is attached to and supporting the bottom head.

19. The cryogenic vessel of claim 15, wherein an insulation material is disposed in the vacuum space.

20. The cryogenic vessel of claim 19, wherein the insulation material is at least one of a plurality of perlite or a plurality of microglass spheres.

21. The cryogenic vessel of claim 15, wherein the liner has a thickness of less than 1.75 inches.

22. The cryogenic vessel of claim 21, wherein the thickness is between about 0.25 inches and about 0.75 inches.

23. The cryogenic vessel of claim 15, wherein liquid hydrogen is storable within the inner vessel.

24. The cryogenic vessel of claim 15, wherein the vacuum condition is a pressure that is 1% or less of atmospheric pressure.

25. The cryogenic vessel of claim 15, wherein the entire outer vessel is made from a reinforced concrete.

* * * * *